US006406773B1

United States Patent (12)

Hendrickson

(10) Patent No.: US 6,406,773 B1
(45) Date of Patent: Jun. 18, 2002

(54) SPORTS BALL TROPHY WITH CONVEX PLAQUE

(76) Inventor: Daniel Hendrickson, 134 E. Maplewynde Rd., West Bend, WI (US) 53095

( * ) Notice: Subject to any disclaimer, the term of this patent is extended or adjusted under 35 U.S.C. 154(b) by 41 days.

(21) Appl. No.: 09/656,696

(22) Filed: Sep. 7, 2000

(51) Int. Cl.[7] .................................................. B32B 3/00

(52) U.S. Cl. .................... 428/67; 428/542.4; 428/913.3

(58) Field of Search ........................... 428/66.5, 13, 14, 428/542.4, 913.3, 67

(56) References Cited

U.S. PATENT DOCUMENTS 5,424,137 A * 6/1995 Stagl ........................ 428/542.4

* cited by examiner

*Primary Examiner*—Alexander S. Thomas
(74) *Attorney, Agent, or Firm*—Quarles & Brady LLP

(57) ABSTRACT

A plaque for trophies making use of an athletic ball or replica as a base provides a convex outer surface mimicking that of the base itself. The convex plaque may be formed using conventional button-making techniques which laminate a printed sheet between a convex form and a clear overlay. The button assembly allows a wide variety of different printed materials to be incorporated into the plaque itself including paper printed on computer-type printers and/or photographs.

9 Claims, 1 Drawing Sheet

SPORTS BALL TROPHY WITH CONVEX PLAQUE

FIELD OF THE INVENTION

The present invention relates to trophies and the like and in particular to a convex trophy plaque fitting into a trophy shaped like an athletic ball.

BACKGROUND OF THE INVENTION

In many sporting activities, it is common to award the players with trophies for participation or other achievement. A conventional "tower" trophy may provide an ornament, often a figure, indicating the particular type of sporting activity to which the trophy relates. The ornament is supported by a stand on the front of which is displayed a plaque, often an engraved metal plate, recording particular achievement. The plaque may, for example, indicate the name of the participant and the date.

A newer form of "sports ball" trophy provides as its base, a replica of the ball used in the sporting activity for which the trophy is awarded. The ball replica may be life-size or of a reduced scale and molded from a polymer foam. A flat disk of plastic provides a plaque which may be fit within a similar cavity molded into the ball replica. The plaque may be printed with information about the award using a special computer printer adapted to handling the rigid disk media.

While the sports ball trophy provides a striking alternative to conventional tower trophy designs, the flat plaque placed against the surface of the ball in the sports ball trophy has an unfinished look and is visually jarring against the curved surface of the ball. At certain viewing angles, the entire surface of the disk can be obscured by glare or shadowing by other surfaces of the ball. Finally, the juxtaposition of the flat surface on the ball can destroy the illusion of the ball being real.

A logical alternative to using a flat plaque is that of printing directly on the surface of the ball itself. Generally this is impractical both because of the irregular shape and character of the ball's surface and the need for each trophy to be essentially one-of-a-kind making decals or transfer printing approaches too expensive.

BRIEF SUMMARY OF THE INVENTION

The present invention provides an improved plaque for sports ball trophies. The plaque uses a button having a domed outer surface that has a pleasing aspect when combined with the similarly convex surface of the ball. The button may incorporate text and/or images from a variety of sources including photographs or printed materials, so no special printing equipment is necessary. The photographs or printed materials may be sandwiched between a clear sheet and a convex shell to provide an attractive, durable and professional appearance.

The curvature of the button not only blends better with the ball into which it is incorporated, but serves to reduce obscuring glare such as can occur with flat plates. The curved outer surface of the button projects from the ball's surface to provide improved visibility.

In addition, the present invention provides a technique for modifying standard sports balls for use with the button or disk plaques, thereby providing improved realism in the ball and eliminating the often costly ball replica. This technique, which is applicable to standard athletic balls having solid cores covered by a fabric or sheet-like material, first cuts the sheet-like material using a cutting die and then machines the underlying core to provide the necessary cavity for the plaque.

Specifically, the present invention provides a sports ball trophy having a ball-shaped base with an outer convex surface, the base including a cylindrical cavity having an axis substantially normal to the convex surface. A button having a perimeter of substantially equal diameter to the cylindrical cavity includes a domed top shell supporting a conformal printed sheet having a printed surface,. The printed sheet overlies the domed top shell so as to reveal its printed surface. The button is affixed within the cylindrical cavity so as to present outwardly a convex surface displaying the printed surface.

Thus it is one object of the invention to provide an attractive and finished plaque suitable for use with a sports ball trophy. The convex outer surface of the button blends visually with the outer convex surface of the ball-shaped base.

The button may be affixed so that the convex surface extends outwardly beyond a rim of the cylindrical cavity.

Thus it is another object of the invention to provide improved prominence and visibility to the printed material on the plaque in keeping with the purpose of the trophy to commemorate a particular event.

The printed sheet may be a photograph print, xerographic print, and a dye transfer print.

Thus it is another object of the invention to provide a plaque that may make use of any printed material from a variety of different sources.

A transparent top sheet may sandwich the printed sheet overlying the domed top between the transparent top sheet and the domed top shell.

Thus it is another object of the invention to provide a high quality, glossy and durable surface to a plaque using any of a variety of different sources for the printed sheet.

The ball may represent a baseball, a tennis ball, a softball, golf ball, football, soccer ball, basketball or volleyball.

Thus it is another object of the invention to provide the benefits of a sports ball trophy in using the ball to visually identify the field of endeavor.

The peripheral surfaces of the printed sheet (and or the transparent sheet) may be crimped over the edge of the domed top shell and captured by a plug fitting behind the domed top shell with respect to the printed sheet and capturing the peripheral surfaces crimped over the edges of the domed top shell between the domed top shell and the plug.

It is another object of the invention to provide a finished and professional looking plaque based on simple materials such as printed paper or photographic paper using standard button assembly techniques. The crimping process eliminates ragged edges that might be present in cutting the printed material and, by drawing the materials together, provides a smooth and bubble-free presentation of the printed material.

One embodiment of the invention may use a standard athletic ball providing a sheet covering and a machinable core. In this embodiment, the sheet covering is first cut with a cutting die to make a circular opening to expose the machinable core. The exposed core is then removed to complete a cylindrical cavity.

Thus it is another object of the invention to use balls that are assembled according to the same techniques used in actual sporting equipment thus producing a far more realistic trophy than could be obtained with foam replicas.

The foregoing objects and advantages may not apply to all embodiments of the inventions and are not intended to define the scope of the invention for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE INVENTION

Figure 1:
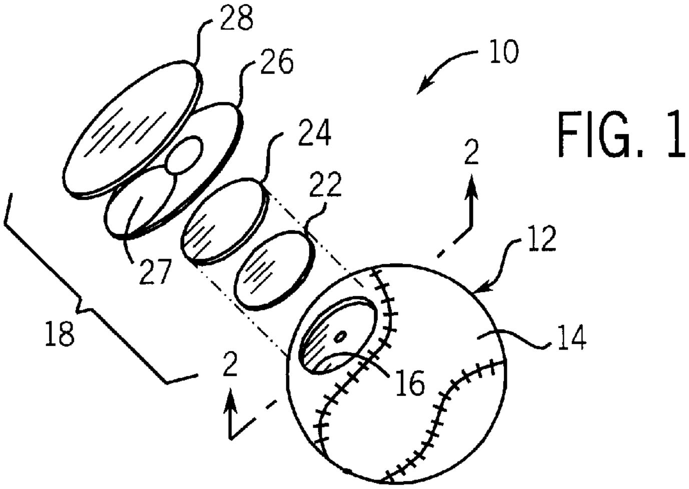
FIG. 1 is an exploded perspective view of the present invention as applied to a baseball-shaped base showing the plaque as formed from button components including a transparent overlay and picture sheet formed over a domed top shell and captured by a plug.

Referring now to FIG. 1, a trophy 10 of the present invention includes a ball-shaped shape base 12 such as may have the outer form of a standard athletic ball. As depicted, the ball-base 12 has the shape and coloring of a baseball, however, other well-known athletic balls may also be used for the base 12 including a softball, golf ball, football, soccer ball, basketball, and volleyball.

As will be described below for those balls having a solid core, either a foam replica of the ball or the actual ball may be used as the base 12. For those balls having an inflated bladder, a foam ball must be used as the base as will be described.

The ball-base 12 has a generally convex outer surface 14 which is interrupted by a cylindrical cavity 16 extending radially from the outer surface 14 toward a center of the ball by approximately ¼ of an inch although other depths are also possible. The radius of the cylindrical cavity 16 will preferably be 2¼ inches; however, it will also be understood that this size may be varied depending on the size of the ball represented by the ball-base 12 or aesthetic concerns.

Figure 2:
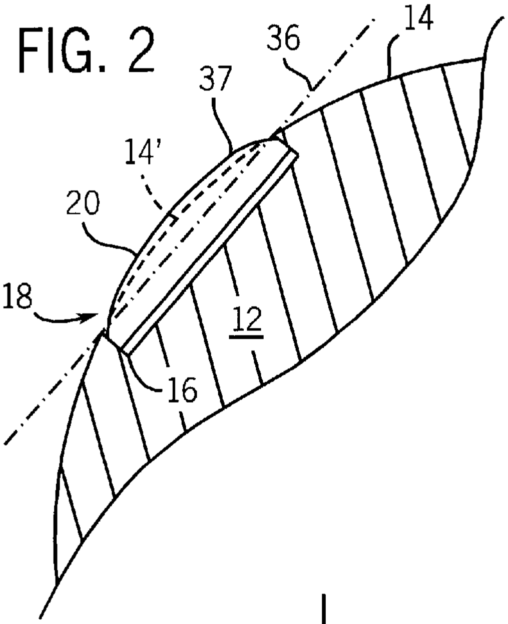
FIG. 2 is a cross-sectional view through FIG. 1 in an assembled state and taken along lines 2—2 and showing positioning of the button to extend outward from the cylindrical cavity in the ball base and showing the button's concave shape which more closely conforms to the curvature of adjacent ball surfaces.
Figure 3:
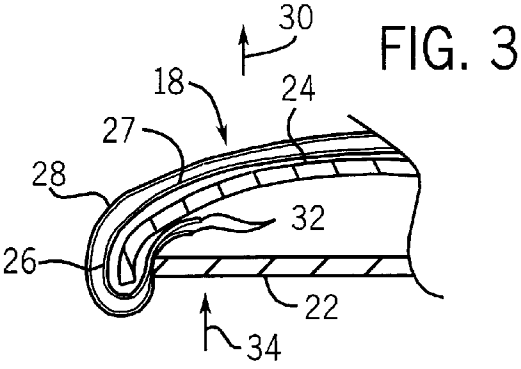
FIG. 3 is a detailed cross-sectional view taken along lines 2—2 of the assembled button of FIG. 2 showing the crimping of the transparent and picture layer under the rim of the domed top shell to be captured by the plug and thereby drawn tight in an overlapping relation.

Referring now to FIGS. 1, 2 and 3, the cylindrical cavity 16 (shown in FIGS. 1 and 2) receives a button 18 presenting a convex outer surface 20 that serves as a trophy plaque. The button 18 may be manufactured using standard button technology and includes a backer plug 22 (such as is typically a plate or collet), a domed top shell 24 (typically a metal shell), a printed sheet 26 and optionally a transparent overlay 28. The printed sheet 26 may be a photograph or paper printed by a number of different techniques well known in the art, including xerographic, dye sublimation or ink jet techniques, and thus may be easily fabricated with inexpensive and standard equipment. The printed sheet 26 may be laminated with a clear material in which case a separate transparent overlay 28 is not required. The transparent overlay 28 may be a clear plastic sheet including Mylar, vinyl or polyester material.

Referring now to FIG. 3, these components of the button 18 are assembled into a single unit in which the printed sheet 26 is placed atop of the domed top shell 24 with a printed surface 27 facing outward as indicated by arrow 30. Over the top of the printed sheet 26 is placed the transparent overlay 28.

As shown in FIG. 1, each of the printed sheets 26 and transparent overlay 28 are cut in disks having a diameter greater than that of the domed top shell 24 and backer plug 22, the latter which have substantially the diameter of the cylindrical cavity 16. Using a standard button-making machine (not shown), the domed top shell 24, printed sheet 26 and transparent overlay 28 are drawn together, with the peripheral edges 32 of the printed sheet 26 and transparent overlay 28 folded around the edge of the domed top shell 24, then crimped between an outer edge of the backer plug 22 and an inner rim of the domed top shell 24 by upward movement of the backer plug 22 with respect to the domed top shell 24 as indicated by arrow 34. This crimping creates a tight lamination of domed top shell 24, printed sheet 26, and transparent overlay 28 in which printed sheet 26 having a printed surface 27 is clearly displayed about the convex form of the domed top shell 24 through the transparent overlay 28.

These button components and machinery for assembling them as described above are available from a number of commercial sources including U.S.A. Buttons, Inc, West Bend, Wis., the assignee of the present invention.

Referring now to FIG. 2, the button 18 is placed within the cylindrical cavity 16 to aesthetically integrate with the convex outer surface 14 of the ball-base 12. In particular, the convex outer surface 20 projects slightly above a tangent plane 36 defined by the rim of the cylindrical cavity 16 so as to follow the convexity of the outer surface 14 along the dotted line of projected outer surface 14' and to be slightly removed from the ball's outer surface 14 for improved visibility. It is not necessary the convex outer surface 20 exactly match the projected outer surface 14' for the button 18 to visually integrate with the ball-base 12. The button 18 may be held within the ball by an adhesive 37.

As mentioned above, the ball-base 12 may be molded, for example, of flexible polyethylene foam or polyurethane foam. Prior to the molding, the inner surface of the mold is polished smooth and pre-coated with a pigmented layer that provides for adhesion by the introduced foam such as causes the formation of a thin skin having a substantially continuous surface without voids conforming to the shape of the molds inner surface. The pigment of the paint may color the skin an arbitrary color differing from that of the polyethylene to provide the appearance of the particular ball.

Figure 4:
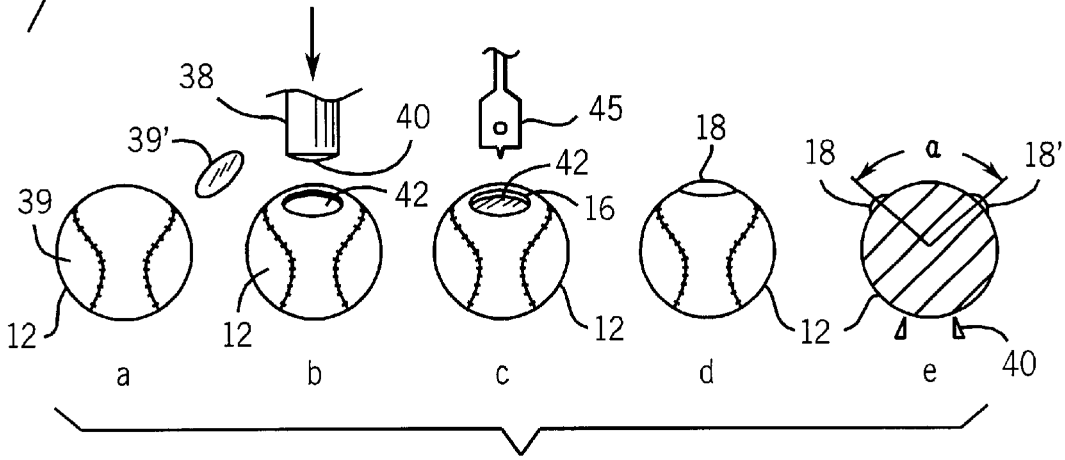
FIGS. 4*a* through 4*e* are perspective views of sequential manufacturing steps in providing a necessary cylindrical cavity in a standard athletic ball having a sheet covering and machinable core in which the sheet covering is die cut to reveal the core which may be machined according to standard methods and showing angled relationships of buttons placed on opposite sides of the ball.

Alternatively as shown in FIG. 4, the ball base 12 may be made of solid core balls being either actual versions of the athletic balls or replicas providing for solid and machinable cores and sheet coverings such as leather, vinyl or other material. Such balls may include, for example, baseballs, softballs and golf balls.

As shown in FIG. 4*a* such balls may be prepared for the present invention by adding the cylindrical cavity 16. In order to do this, a circular cutting die 38, being a ring-shaped band having a sharpened edge 40, is first pressed downward against the ball using an arbor press or the like as shown in FIG. 4*b*. The circular cutting die 38 removes a plug 39' from the sheet material 39 to expose an inner core 42. The inner core 42 may be bored using a conventional machining technique such as a spade bit 45, a Forstner bit or an end mill as shown in FIG. 4*c*. The button 18 may then be pressed into the formed cylindrical cavity 16 to complete the trophy as shown in FIG. 4*d*.

Referring to FIG. 4*e*, a second button 18' may be placed obverse to the first button in a second cylindrical cavity 16 prepared in the same manner as indicated in FIGS. 4*a*–4*d*. The angle a between the normals of these buttons 18 and 18' (i.e., lines centered through and generally perpendicular to the outer surface of the domed top shell 24 at the center and intersecting the center of the ball base 12) will be acute providing improved visibility to the buttons when the trophy 10 is placed on a stand 40 such as a cylindrical ring for desktop display. Alternatively, and often for bigger trophies, the angle $\alpha$ may be 180 degrees.

It is specifically intended that the present invention not be limited to the embodiments and illustrations contained herein, but that modified forms of those embodiments including portions of the embodiments and combinations of elements of different embodiments also be included as come within the scope of the following claims.

I claim:

1. A sports ball trophy comprising:

a ball-shaped base having an outer convex surface broken by a cylindrical cavity having an axis substantially normal to the convex surface;

a button having a circular perimeter of substantially equal diameter to the cylindrical cavity, the button including a domed top shell and a printed sheet having a printed surface, the printed sheet overlying the domed top shell and conforming to the domed top shell so as to reveal its printed surface; wherein the button is affixed within the cylindrical cavity so as to outwardly present a convex surface displaying the printed surface.

2. The sports ball trophy of claim 1 further including a transparent top sheet wherein the printed sheet overlying the domed top shell is sandwiched between the transparent top sheet and the domed top shell.

3. The sports ball trophy as recited in claim 1 wherein the button is affixed within the cylindrical cavity so that the convex surface extends outwardly beyond a rim of the cylindrical cavity.

4. The sports ball trophy as recited in claim 1 wherein the printed sheet is selected from the group consisting of a photograph, xerographic print, and a dye transfer print.

5. The sports ball trophy as recited in claim 1 wherein ball-shaped base has an outer surface modeled and colored to match a ball used in sporting events and selected from the group consisting of a baseball, a tennis ball, a softball, a golfball, a football, a soccerball, a basketball and a volleyball.

6. The sports ball trophy as recited in claim 1 wherein the ball shaped base is molded polymer foam.

7. The sports ball trophy as recited in claim 1 wherein the printed sheet is paper.

8. The sports ball trophy as recited in claim 1 wherein peripheral surfaces of the printed sheet are crimped over an edge of the domed top shell.

9. The sports ball trophy as recited in claim 8 further including a plug fitting behind the domed top shell with respect to the printed sheet and capturing the peripheral surface of the printed sheet crimped over the edge of the domed top shell between the plug and the domed top shell.

* * * * *

UNITED STATES PATENT AND TRADEMARK OFFICE

CERTIFICATE OF CORRECTION

PATENT NO. : 6,406,773 B1
DATED : June 18, 2002
INVENTOR(S) : Daniel Hendrickson It is certified that error appears in the above-identified patent and that said Letters Patent is hereby corrected as shown below:

<u>Column 3,</u>
Line 38, "ball-shaped shape" should be -- ball shaped --.

Signed and Sealed this

Twentieth Day of August, 2002

*Attest:*

JAMES E. ROGAN

*Attesting Officer*

*Director of the United States Patent and Trademark Office*